Feb. 23, 1971    R. C. BRACKEN    3,565,590

METHOD AND APPARATUS FOR PRODUCING TRICHLOROSILANE
Filed July 11, 1968

INVENTOR:
RONALD C. BRACKEN

United States Patent Office 3,565,590
Patented Feb. 23, 1971

3,565,590
METHOD AND APPARATUS FOR PRODUCING TRICHLOROSILANE
Ronald C. Bracken, Richardson, Tex., assignor to Texas Instruments Incorporated, Dallas, Tex., a corporation of Delaware
Filed July 11, 1968, Ser. No. 744,105
Int. Cl. B01j 7/00; C01b 33/02, 33/08
U.S. Cl. 23—366                                      5 Claims

ABSTRACT OF THE DISCLOSURE

Trichlorosilane is produced in a reactor packed with a porous mass of sintered silicon particles. A furnace surrounding the upper end of the reaction chamber melts the top portion of the porous mass to form a pool of molten silicon. By flowing silicon tetrachloride through the porous mass, a reaction takes place within the reactor when the $SiCl_4$ contacts the molten silicon. This reaction produces silicon dichloride. To produce trichlorosilane, the silicon dichloride is reacted with HCl downstream of the reactor output.

---

This invention relates to the production of a compound of silicon, hydrogen, and a halogen, and more particularly to apparatus and a method for producing a silicon compound by a reaction with molten silicon above a porous mass.

It has been suggested that trichlorosilane could be produced by a two-stage reaction wherein the first stage includes reacting silicon tetrachloride with liquid silicon to produce silicon dichloride, and the second stage includes reacting the silicon dichloride of the first stage with hydrogen chloride to produce trichlorosilane. In order to carry out this reaction, the temperatures of the silicon dichloride must be maintained fairly high (at least over 1000° C). This temperature requirement, in conjunction with a chloride atmosphere, severely limits the selection of materials available for the construction of a reactor for carrying out the reaction.

Heretofore, the most commonly accepted technique for producing trichlorosilane required the flowing of hydrogen chloride through a fluidized bed of silicon powder in a reactor. The operating temperature of units of this type is approximately 400° C., thereby permitting the use of a wide variety of materials for the construction of the reactor. However, this low temperature causes deposits of $AlCl_3$, $FeCl_3$ and $FeCl_2$ to build up in the reactor which necessitates periodic shut downs of the reactor for removal of the deposits. Another shortcoming of a process of this nature is that it produces long chain polymers which are difficult to remove. Also, the fluidized bed reactor produces silicon tetrachloride as a by-product which must be removed from the stream of trichlorosilane. After removal, the silicon tetrachloride is reduced in a burner to silicon dioxide and hydrogen chloride. Although the hydrogen chloride can be reused, silicon dioxide is a waste product and some of the silicon introduced in the system will be lost.

In accordance with the present invention, trichlorosilane is produced by packing a reactor with sintered silicon particles and forming a pool of molten silicon in the top portion of the mass. Silicon tetrachloride passes through the porous mass and reacts with the molten silicon to produce silicon dichloride. Hydrogen chloride is introduced into the stream of silicon dichloride to produce trichlorosilane for use in the production of semiconductor grade silicon. The temperature of the pool of molten silicon is such as to immediately vaporize most of the impurities of metallurgical grade silicon, or at least minimize such deposits in the reactor. In the process of the present invention, the formation of long chain polymers and other by-products in the reactor may be easily avoided.

An object of the present invention is to provide a system for producing a silicon compound by a reaction with molten silicon. Another object of this invention is to provide a system for producing a silicon compound with a minimum of by-products. A further object of this invention is to provide a system for producing trichlorosilane at temperatures high enough to volatilize the major impurities of metallurgical grade silicon. Still another object of this invention is to provide a process for producing a silicon compound with a minimum of by-products. An additional object of this invention is to provide a process for producing trichlorosilane by passing silicon tetrachloride through a pool of molten silicon above a porous mass.

A more complete understanding of the invention and its advantages will be apparent from the specification and claims and from the accompanying drawings illustrative of the invention.

Referring to the drawings.

Figure 1:
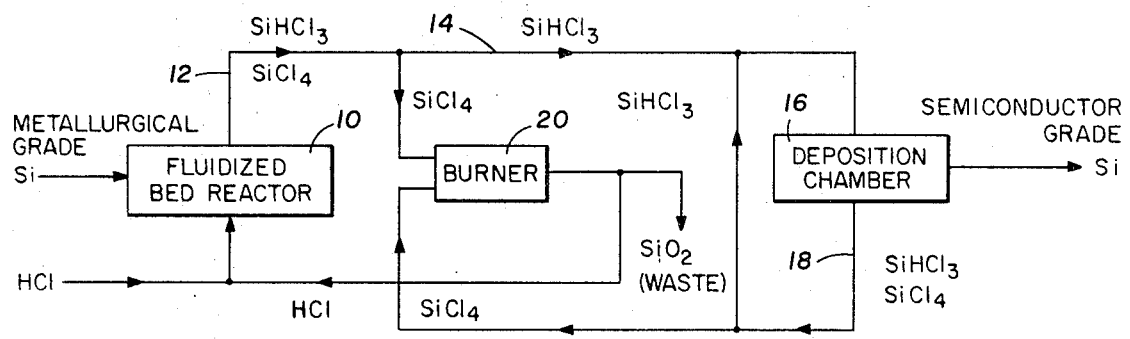
FIG. 1 illustrates a flow diagram of a typical prior art fluidized bed reactor system for producing semiconductor grade silicon.

Referring to FIG. 1, the fluidized bed reactor 10 is supplied a raw material of metallurgical grade silicon and hydrogen chloride; the latter through a line 12. The hydrogen chloride reacts with the silicon and produces a continuous churning action in the reactor 10. This reaction produces trichlorosilane which can be reacted to produce HCl, Si and $SiCl_4$ in a deposition chamber 16 at a temperature around 1200° C. Although other silicon compounds may be used, trichlorosilane is preferred for the reaction because the H/Cl mole ratio can be maintained higher in a trichlorosilane-hydrogen stream than in, for example, a silicon tetrachloride-hydrogen stream for equivalent silicon concentrations. It is this H/Cl ratio that influences the rate of silicon deposition in the chamber 16. Thus, in the production of semiconductor grade silicon, the use of trichlorosilane is favored over silicon tetrachloride because of faster deposition rates and also because it is apparently easier to remove phosphorous and boron compounds by distillation. A distillation column (not shown) separates the silicon tetrachloride from the stream of trichlorosilane which is passed to the deposition chamber 16 through a line 18. The deposition chamber may be of any of the well known designs; these range from simple heated quartz tubes to depositions on high purity silicon rods.

An effluent of trichlorosilane and silicon tetrachloride may be expected from the deposition chamber 16. The trichlorosilane will be recirculated and remixed in the line 18 to be again cycled through the deposition chamber 16. However, the silicon tetrachloride should not be recycled and is fed into a burner 20 along with the silicon tetrachloride from the reactor 10. The burner 20 burns the $SiCl_4$ in a $H_2$—$O_2$ flame to produce $SiO_2$ and HCl. The HCl is condensed from the off-gases from the burner; the $SiO_2$ is disposed of as a waste product. The hydrogen chloride gas is then recirculated through reactor 10.

Although somewhat simplified, it will be apparent that considerable energy is expended with the system of FIG. 1 by the need for reclaiming hydrogen chloride in the burner 20. Further, a fuidized bed reactor produces long chain polymers which may be difficult to handle. Because the reaction takes place throughout the reactor 10, care must be exercised in the selection of the material and the operating temperature to prevent contamination of the trichlorosilane. Typically, the fluidized bed process operates best at a temperature of 400° C. which is low enough to minimize contamination from the reactor material. However, at a temperature of 400° C., the impurities of the metallurgical grade silicon will deposit out on the bottom of the reactor. In time, this requires snutting down the reactor and removing these impurities.

Figure 2:
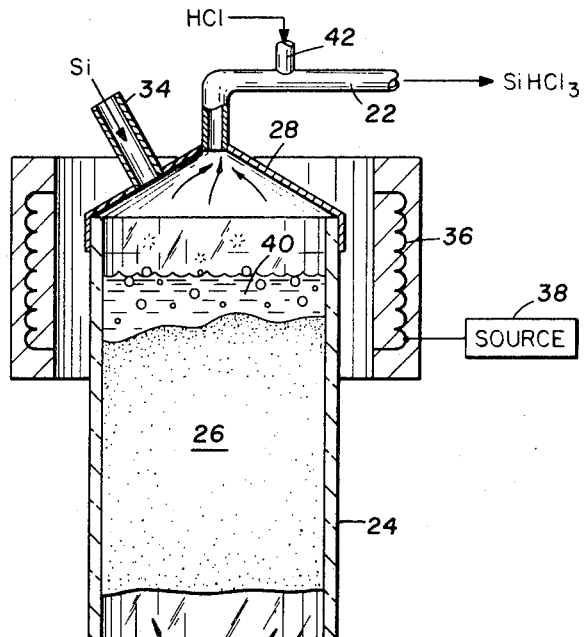
FIG. 2 illustrates schematically a reactor in accordance with the present invention for producing a silicon compound at a minimum by-products level.

In accordance with the present invention, the reactor shown in FIG. 2 replaces the fluidized bed reactor 10 and eliminates the need for the burner 20. Thus, the trichlorosilane produced in a pipe 22 may be fed directly to a deposition chamber for the production of semiconductor grade silicon if the trichlorosilane level in the stream is sufficiently high. The reactor of FIG. 2 includes a quartz tube 24 packed with sintered silicon to form a porous mass 26. The silicon particles have been pressed and sintered so that they are stationary when the tube is held in a vertical position. However, the sintering has been controlled such that the mass will be still porous, thereby allowing a gas to pass through it. After the quartz tube 24 has been packed, a top cover 28 is positioned to enclose the upper end and a lower end plate 30 positioned to enclose the lower end. Note the lower end plate includes an inlet pipe 32 for introduction of a gas at the bottom of the reactor, and the cover 28 includes a connection to the pipe 22 for channeling gas from the reactor. The cover 28 also includes a filler tube 34 for adding additional particles of metallurgical grade silicon to the reactor as required to replenish that used up in the production of trichlorosilane.

A furnace 36 is positioned around the upper end of the quartz tube 24 and connects to a source of electrical energy 38. The temperature within the furnace 36 is adjusted to maintain a temperature within the quartz tube 24 above the melting point of silicon (approximately 1426° C.). Thus, a pool 40 of molten silicon will be formed at the top of the quartz tube 24 in the porous mass of sintered silicon particles. The surface tension of molten silicon is such that it will not infiltrate the porous mass 26.

In operation, prior to energizing the furnace 36 to form the pool 40, a flow of silicon tetrachloride (or a stream of He or Ar saturated with silicon tetrachloride) is passed through the porous mass 26 of sintered silicon. This prevents the silicon from freezing solid and thereby causing an obstruction of the gas flow. The furnace is now energized and a pool 40 of molten silicon forms in the top of the porous mass 26. As the silicon tetrachloride under a positive pressure passes through the porous mass 26, it contacts the molten silicon. This contact between the molten silicon and the silicon tetrachloride will be good. As the silicon tetrachloride passes through the pool of molten silicon, the following reaction takes place:

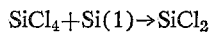

This reaction should be nearly at equilibrium at a point just above the silicon liquid surface. The resultant silicon dichloride from this reaction passes from the quartz tube 24 through the pipe 22. Hydrogen chloride is introduced into the pipe 22 through a pipe 42 and reacts with the silicon dichloride to produce trichlorosilane. The complete reaction takes place as follows:

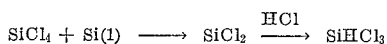

Depending on the reaction rate of the silicon tetrachloride with the molten silicon, the furnace 36 may be turned off after this reaction has commenced. However, some heat may have to be supplied to maintain the cover 28 at a temperature high enough to prevent condensation of the silicon dichloride thus avoiding the formation of long chain polymers. The polymer formation can be eliminated in other parts of the system by avoiding rapid cooling (quenching) of the gas stream containing SiCl₂. If the stream containing silicon dichloride is cooled slowly from the reaction chamber, no polymers will be formed but only the volatile chlorides (SiHCl₃, SiCl₄, etc.).

As the silicon in the pool 40 reacts with the SiCl₄, additional silicon particles are required to maintain a preset level; these are supplied through the tube 34. The rate at which additional particles will have to be supplied depends upon the rate of production of the silicon dichloride. These additional silicon particles melt in the pool 40 thereby maintaining it at a preset level. Since the particles melt, the particle size of the silicon is not critical and the most economical size may be used.

As mentioned, the melting point of silicon is approximately 1426° C. At this temperature, most of the impurities found in metallurgical grade silicon (the raw material passed through the pipe 34) will be volatilized. Since both FeCl₃ and FeCl₂, which make up most of the impurities in the raw material, are vaporized at or below 1400° C., very little if any deposits will be formed in the reactor. These impurities pass out of the reactor through the pipe 22 as vapors where they can be removed by standard filtering techniques.

When cleaning of the reactor is required, the feed of additional silicon through the pipe 34 is discontinued. Now, as the silicon reacts with the silicon tetrachloride, the level of the pool 40 drops. To maintain the pool 40, the furnace is lowered and the pool continuously replenished from the sintered silicon of the porous mass 26. As the pool approaches the bottom of the quartz tube 24, the furnace is held in a fixed position such that a few inches of sintered silicon remains unmelted at the bottom of the tube. The reaction between the liquid silicon and the silicon tetrachloride will soon deplete the liquid from the molten pool 40. Once the pool is empty, the flow of silicon tetrachloride will be cut off. The quartz tube 24 can then be cleaned and repacked with silicon powder and the apparatus ready to begin operation again.

Figure 3:
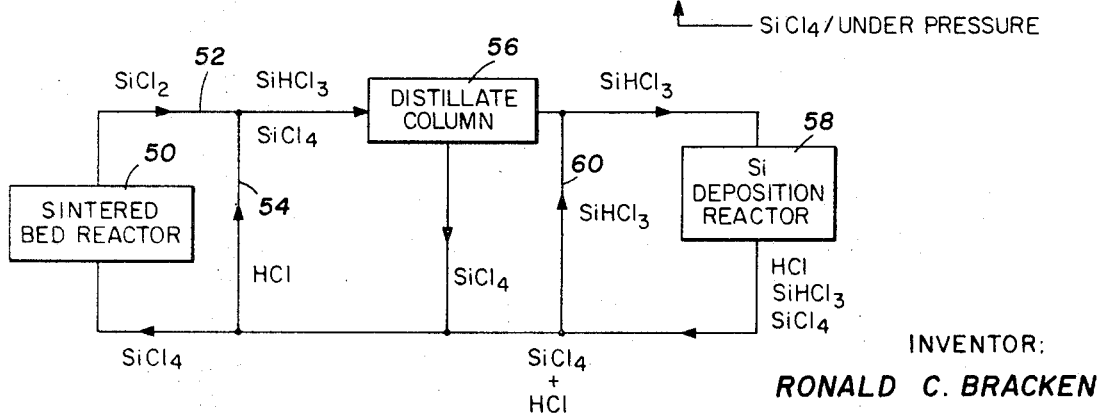
FIG. 3 illustrates a flow diagram of a typical sintered bed reactor system.

A schematic of a reactor system for the production of semiconductor grade silicon using a reactor in accordance with the present invention is shown in FIG. 3. The sintered bed reactor 50 produces silicon dichloride in a line 52 which reacts with HCl supplied by a line 54. Both trichlorosilane and silicon tetrachlorine result from this reaction and are passed to a distillate column 56 where the SiHCl₃ is separated from the SiCl₄. The trichlorosilane is passed to a deposition chamber 58, while the silicon tetrachloride is returned as the feed to the sintered bed reactor 50.

In addition to semiconductor grade silicon, the reaction in the chamber 58 produces HCl, SiCl₄. The effluent from the deposition chamber 58 contains the HCl and SiCl₄, and also includes some SiHCl₃. The trichlorosilane will be recirculated and mixed in the line 60 to be again cycled through the deposition chamber 58. With a sintered bed reactor as illustrated in FIG. 2, the SiCl₄ in the effluent from the chamber 58 is passed to the reactor 50 where it will be again reacted with liquid silicon. The HCl of the effluent will be used in the reaction with the SiCl₂ produced by the reactor 50. Thus, the need for expending energy in a burner has been eliminated.

In addition to a compound of silicon and chlorine, a compound of silicon and one of the halogens, (e.g., bromine or iodine), may be pumped through the porous mass 26. With a compound of silicon and one of the above halogens, the material in the pipe 22 will be X₍₃₎SiH, where X includes the halogens of bromine or iodine. The reaction with the molten silicon produces (X)₂Si. Some other gas besides HCl will be reacted with the (X)₂Si downstream of the reactor 10. With iodine and bromine, it is particularly important that the end plate 28 be maintained in a heated condition to prevent condensation of the higher melting silicon halide.

While only one embodiment of the invention, together with modifications thereof, has been described in detail herein and shown in the accompanying drawings, it will be evident that various further modifications are possible

What is claimed is:

1. A process for the production of $(X)_3SiH$ from a reaction of $(X)_2Si$ with $(X)H$, where $(X)$ includes the halogens of chlorine, bromine, iodine, comprising:

melting the top portion of a porous mass of sintered silicon particles packed in a reaction chamber to form a pool of molten silicon, and flowing a compound of $(X)_4Si$ through the porous mass of silicon particles and the pool of liquid silicon to produce $(X)_2Si$, and reacting said $(X)_2Si$ with $(X)H$ to produce $(X)_3SiH$.

2. A process for the production of $(X)_3SiH$ as set forth in claim 1 wherein the halogen is chlorine.

3. A process for the production of $(X)_3SiH$ as set forth in claim 1 wherein the halogen is bromine.

4. A process for the production of $(X)_3SiH$ as set forth in claim 1 wherein the halogen is iodine.

5. A process for producing trichlorosiliane from a reaction of silicon dichloride with HCl comprising:

melting the top portion of a porous mass of sintered silicon particles packed in a reaction chamber to form a pool of molten silicon, flowing silicon tetrachloride through the porous mass of silicon particles and the pool of liquid silicon to contact the $SiCl_4$ with the molten silicon to produce silicon dichloride, and reacting the silicon dichloride with HCl to produce trichlorosilane.

References Cited

UNITED STATES PATENTS 3,148,035   9/1964   Enk et al. _____ 23—366

EARL C. THOMAS, Primary Examiner

H. S. MILLER, Assistant Examiner

U.S. Cl. X.R.

23—223.5, 277